US012503897B2

(12) United States Patent
Li et al.

(10) Patent No.: US 12,503,897 B2
(45) Date of Patent: Dec. 23, 2025

(54) HINGE STRUCTURE

(71) Applicant: Guangzhpu Guub Technology Co., Ltd., Guangdong (CN)

(72) Inventors: Jingong Li, Guangdong (CN); Jianhong Li, Guangdong (CN)

(73) Assignee: Guangzhou Guub Technology Co., Ltd, Guangzhou (CN)

( * ) Notice: Subject to any disclaimer, the term of this patent is extended or adjusted under 35 U.S.C. 154(b) by 0 days.

(21) Appl. No.: 18/670,681

(22) Filed: May 21, 2024

(65) Prior Publication Data

US 2025/0146339 A1 May 8, 2025

(30) Foreign Application Priority Data

Nov. 7, 2023 (CN) ......................... 202323005358.7

(51) Int. Cl.
*E05D 1/06* (2006.01)
*E05D 3/02* (2006.01)

(52) U.S. Cl.
CPC .......... *E05D 3/02* (2013.01); *E05Y 2201/682* (2013.01); *E05Y 2800/278* (2013.01)

(58) Field of Classification Search
CPC ....... E05D 7/10; E05D 7/1005; E05D 7/1016; E05D 7/1044; E05D 7/105; E05D 7/1022; E05D 7/1055; E05D 3/02; E05D 2007/1027; E05D 5/128; E05D 5/16; E05D 5/065; E05D 5/10; E05D 7/12; E05D 7/123; E05D 2007/126; E05Y 2201/682; E05Y 2800/278; E05Y 16/266; E05Y 16/269
See application file for complete search history.

(56) References Cited

U.S. PATENT DOCUMENTS

| | | | | | |
|---|---|---|---|---|---|
| 2,766,901 | A | * | 10/1956 | Sunko | E05D 5/10 220/843 |
| 3,046,701 | A | * | 7/1962 | Small | A45B 25/18 52/73 |
| 3,091,357 | A | * | 5/1963 | Weinhart | E05D 7/12 16/382 |
| 3,348,259 | A | * | 10/1967 | Wilhelmsen | E05D 1/06 16/269 |
| 4,649,679 | A | * | 3/1987 | Arens | E04F 19/10 428/53 |

(Continued)

FOREIGN PATENT DOCUMENTS

GB 2395227 A * 5/2004 ........... B65D 43/167

*Primary Examiner* — Chuck Y Mah

(57) ABSTRACT

The application discloses a hinge structure which comprises: a first board body and a first connecting portion extending from a portion of an edge of the first board body and bending to define a first groove; a second board body and a second connecting portion extending from a portion of an edge of the second board body and bending to define a second groove; and a hinge shaft extending through the first groove and the second groove; wherein a maximum rotation angle between the first and second connecting portions is approximately 90°. Throughout an original state in which the first and the second connecting portions are not rotated relative to each other, a limiting state in which they are rotated approximately 90°, and an intermediate transition state between the two states, a first opening of the first groove and a second opening of the second groove always face different directions.

9 Claims, 5 Drawing Sheets

(56) References Cited

U.S. PATENT DOCUMENTS

| | | | | | |
|---|---|---|---|---|---|
| 5,070,577 | A * | 12/1991 | Bonneville | E05D 7/1072 16/268 |
| 5,984,566 | A * | 11/1999 | Blaha | A47B 87/002 403/220 |
| 6,315,154 | B1 * | 11/2001 | Newby, Sr. | B65D 43/165 220/4.23 |
| 6,499,188 | B1 * | 12/2002 | Cheng | A45C 13/005 16/269 |
| 6,834,416 | B2 * | 12/2004 | Wang | B60P 1/43 16/389 |
| 11,039,660 | B2 * | 6/2021 | Goldston | A43B 7/1445 |

* cited by examiner

HINGE STRUCTURE

CROSS-REFERENCE TO PRIOR APPLICATION

The application claims the benefit of the priority of Chinese Patent Application No. 202323005358.7 filed on Nov. 7, 2023, the contents of which are incorporated herein by reference.

TECHNICAL FIELD

The application relates to the technical field of hinge structures, more particularly to a hinge structure.

BACKGROUND

Currently, in order to achieve rotatable hinge connections between boards, accessories such as leaves, hinges, and rotation shafts are conventionally used and are fixed by screws, riveting, welding, and the like. Although standardized general-purpose components have reduced manufacturing costs, it is difficult for the products produced on a large scale to cut mounting costs and assembly costs of the general-purpose components. In addition, in order to ensure the hinge connection quality of relatively long seams of joints, usually long hinge leaves with higher costs or more sets of short hinge leaves which meet the coaxial requirement and have higher assembly demands can be used.

SUMMARY

The application aims to provide a hinge structure which simplifies the hinge structure, reduces mounting difficulty, and saves economic costs.

In order to achieve the above goal, the application provides a hinge structure, comprising:

a first board comprising a first board body and a first connecting portion provided on at least one side thereof, wherein the first connecting portion extends from a portion of an edge of the first board body and bends to define a first groove;

a second board comprising a second board body and a second connecting portion provided on at least one side thereof, wherein the second connecting portion extends from a portion of an edge of the second board body and bends to define a second groove; and a hinge shaft disposed to extend through the first groove of the first connecting portion and the second groove of the second connecting portion;

a maximum rotation angle between the first connecting portion and the second connecting portion is approximately 90°, and throughout an original state in which the first connecting portion and the second connecting portion are not rotated relative to each other, a limiting state in which they are rotated approximately 90° relative to each other, and an intermediate transition state between the original state and the limiting state, a first opening of the first groove of the first connecting portion and a second opening of the second groove of the second connecting portion always face different directions.

In some embodiments of the application:

when the first connecting portion and the second connecting portion are in the limiting state, the first board body may be substantially perpendicular to the second board body, a portion of an edge of the first board body may abut against the second connecting portion, and a portion of an edge of the second board body may abut against the first connecting portion.

In some embodiments of the application:

the first board body and the first connecting portion may be integrally formed; and the second board body and the second connecting portion may be integrally formed.

In some embodiments of the application:

when the first connecting portion and the second connecting portion are in the original state, the first board body and the second board body may be substantially parallel to each other, and the first opening of the first groove of the first connecting portion and the second opening of the second groove of the second connecting portion face opposite directions.

In some embodiments of the application:

the first connecting portion and the second connecting portion may be provided at a same side of the first board body and the second board body.

In some embodiments of the application:

when the first connecting portion and the second connecting portion have the maximum rotation angle therebetween, the first board body and the second board body may be substantially perpendicular to each other, the first opening of first groove of the first connecting portion may face towards a side of the second board body opposite to the second connecting portion, and the second opening of second groove of the second connecting portion ay face towards a side of the first board body opposite to the first connecting portion.

In some embodiments of the application:

the first connecting portion and the second connecting portion may be all formed with rectangular grooves.

In some embodiments of the application:

a clearance between the hinge shaft and an inner wall of the first groove of the first connecting portion may be less than a wall thickness of the first connecting portion, and a clearance between the hinge shaft and an inner wall of the second groove of the second connecting portion may be less than a wall thickness of the second connecting portion.

In some embodiments of the application:

the first connecting portion and the second connecting portion may be arranged in a staggered manner along an extend direction of the hinge shaft.

In some embodiments of the application:

the first connecting portion and the second connecting portion may mutually conceal a periphery surface of the hinge shaft.

Compared with the existing technologies, the hinge structure of the application has advantages as follows.

The hinge structure of the application provides the first connecting portion and the second connecting portion formed by bending the two boards, and the hinge shaft extending through the first connecting portion and the second connecting portion. As it applies the structure which combines the bending process with the long shaft, instead of hinge leaves in the prior art, it simplifies the hinge structure, reduces mounting difficulty, and saves economic costs.

Figure 1:
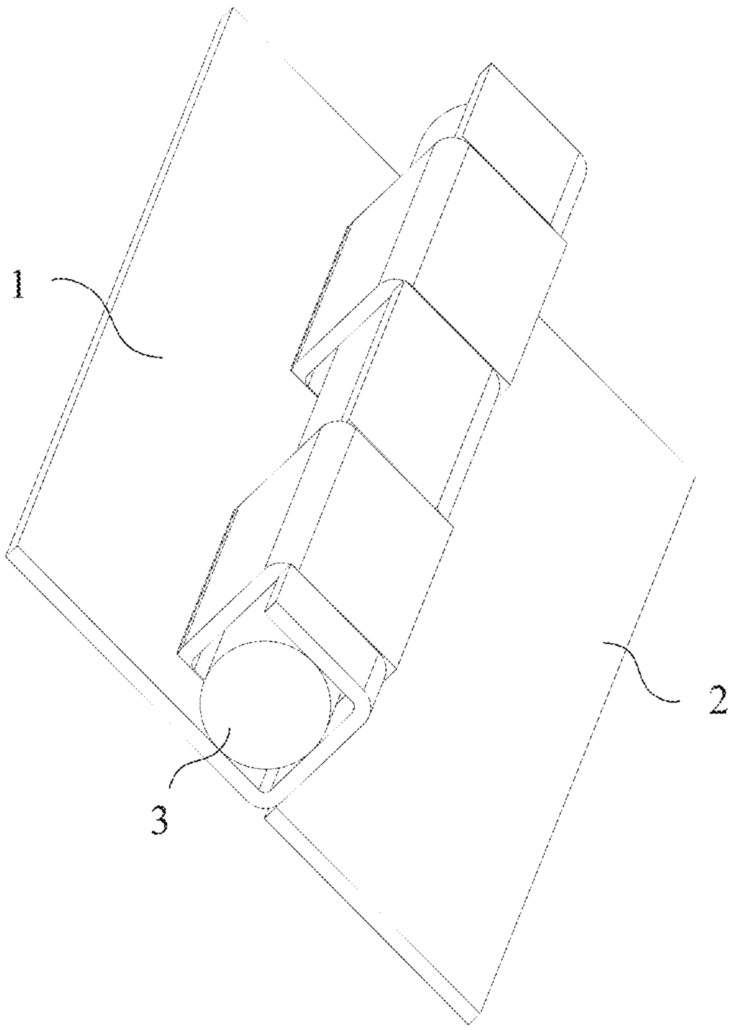
FIG. 1 is a schematic structural view illustrating a hinge structure according to an embodiment of the application in an original state.

In the drawings: 1. first board; 2. second board; 3. hinge shaft; 11. first board body; 12. first connecting portion; 21. second board body; 22. second connecting portion.

DETAILED DESCRIPTION OF ILLUSTRATED EMBODIMENTS

The particular implementations of the application will be described below in detail in conjunction with the drawings and embodiments. The following embodiments are intended for illustration of the application and are not intended to limit the scope of the application.

It should be explained that the terms, such as "center", "longitudinal", "transverse", "upper", "lower", "front", "rear", "left", "right", "vertical", "horizontal", "top", "bottom", "inner", and "outer" as used in the description of the application, refer to orientation and position relationships as shown in the drawings for convenience of description and for the purpose of simplicity. They are not intended to indicate or hint a limitation in terms of specific orientation or configuration and operation with specific orientation to the described device or element, and should not be regarded as a limitation to the present application. Furthermore, the terms "first", "second", and "third" are used for convenience of description and are not intended to indicate or imply relative importance.

It should be explained that, unless defined or specified otherwise, the terms such as "mount", "connect" and "attach" used in the description of the present application are intended to have meanings commonly understood in a broad sense. For example, they may refer to fixedly connect, or detachably connect, or integrally connect; or mechanically connect, or electrically connect; or directly connect, or indirectly connect via an intermedium, or internally communicate between two components. The meanings of these terms used in the present application may be understood by those skilled in the art in accordance with specific conditions.

Furthermore, unless explicitly stated otherwise, "the plurality of" as used in the description of the present application refers to two or more.

The meanings of these terms used in the present application may be understood by those skilled in the art in accordance with specific conditions.

Figure 3:
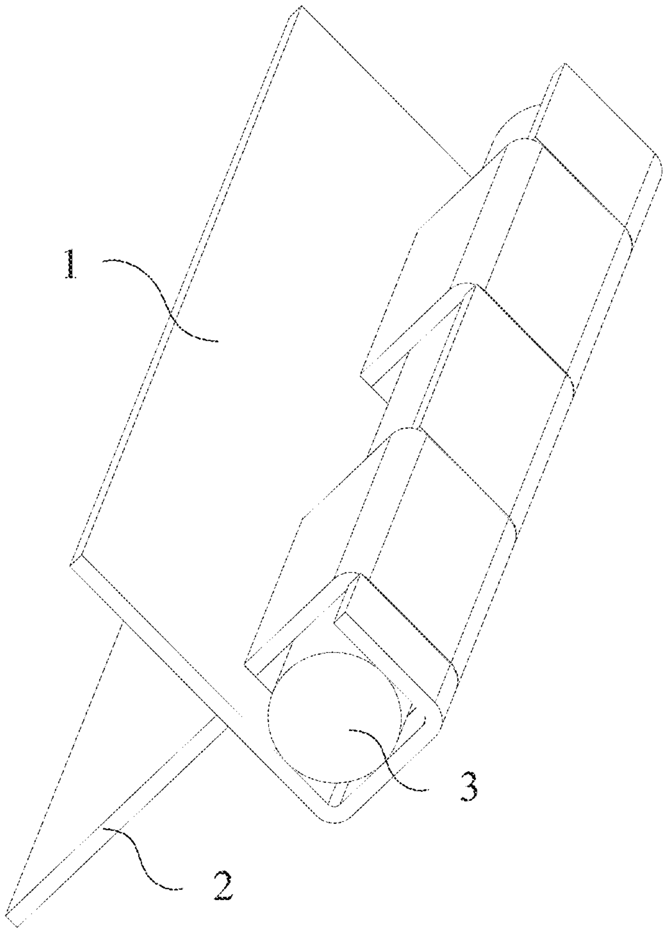
FIG. 3 is a schematic structural view illustrating a hinge structure according to an embodiment of the application in a limiting state.

Referring to FIGS. 1 and 3, a hinge structure according to a preferred embodiment among the embodiments of the application comprises a first board 1, a second board 2, and a hinge shaft 3.

The hinge structure in the embodiment typically may be applied to hinge connections between boards such as cabinet boards, box boards, and outside casing plates.

Figure 2:
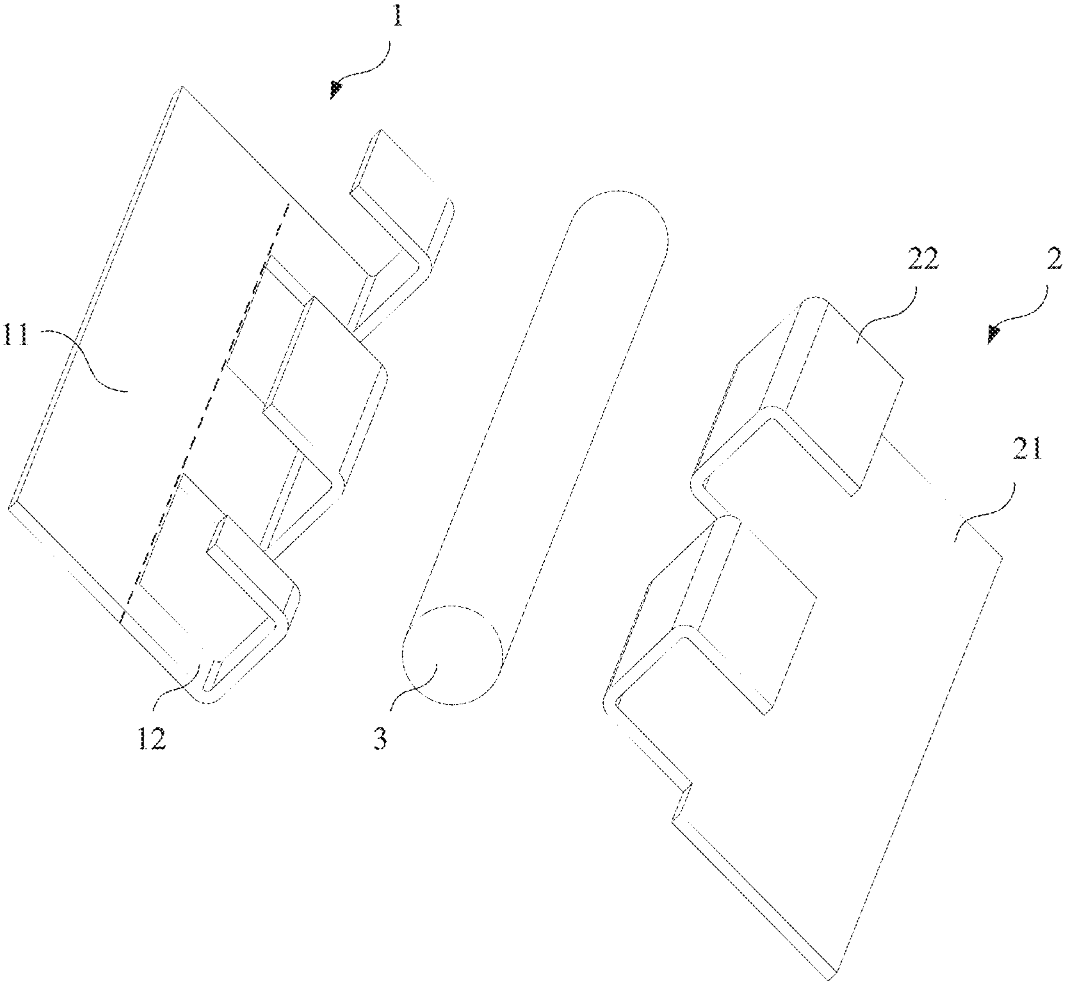
FIG. 2 is an exploded view illustrating components and parts of the hinge structure of FIG. 1.
Figure 4:
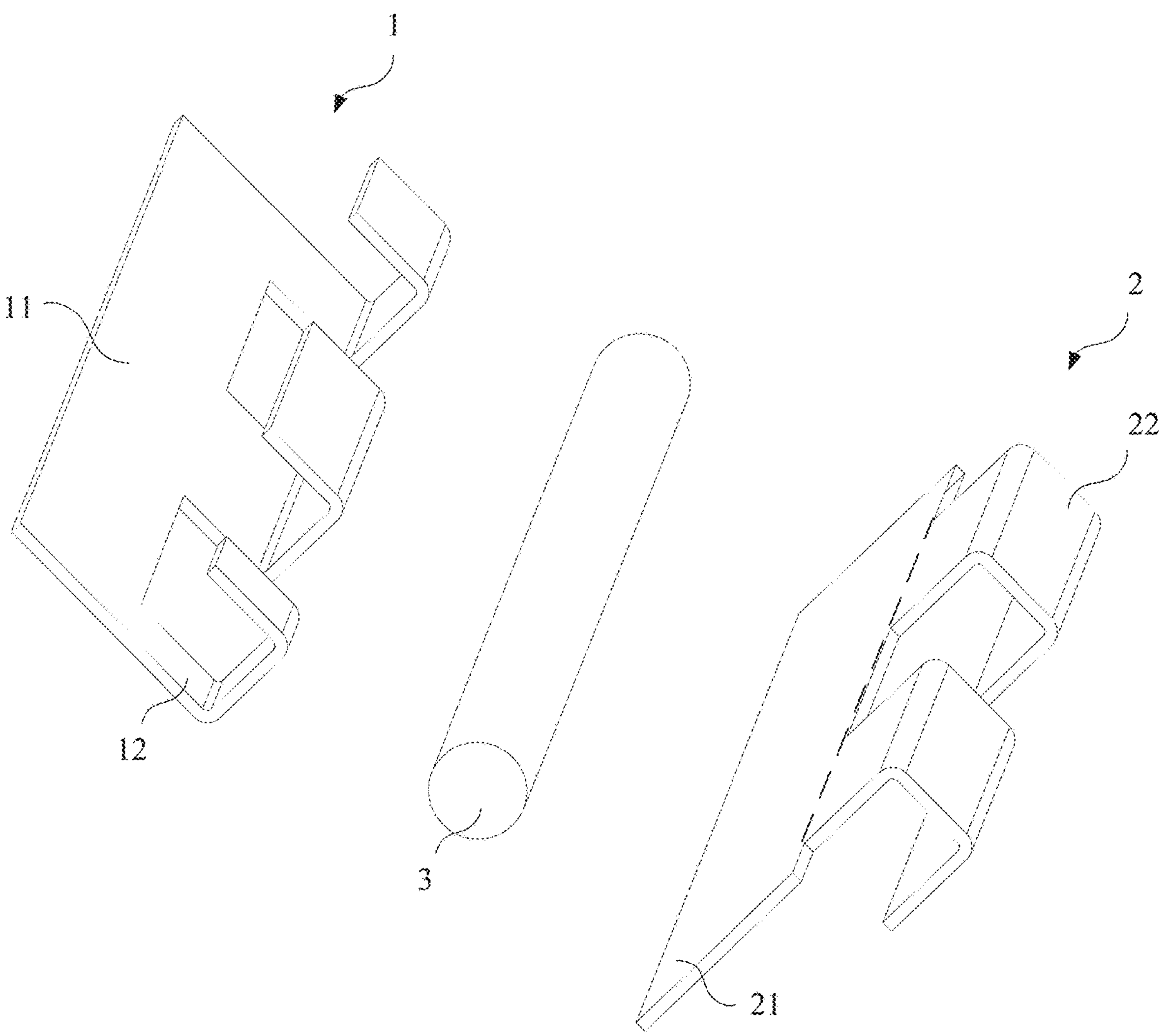
FIG. 4 is an exploded view illustrating components and parts of the hinge structure of FIG. 3.

Referring to FIGS. 2 and 4, the first board 1 comprises a first board body 11 and first connecting portions 12 provided on at least one side thereof, wherein the first connecting portions 12 extend from a portion of the edge of the first board body 11 and bend to define a first groove.

The second board 2 comprises a second board body 21 and second connecting portions 22 provided on at least one side thereof, wherein the second connecting portions 22 extend from a portion of the edge of the second board body 21 and bend to define a second groove.

The hinge shaft 3 is disposed to extend through the first grooves of the first connecting portions 12 and the second grooves of the second connecting portions 22.

Figure 5:
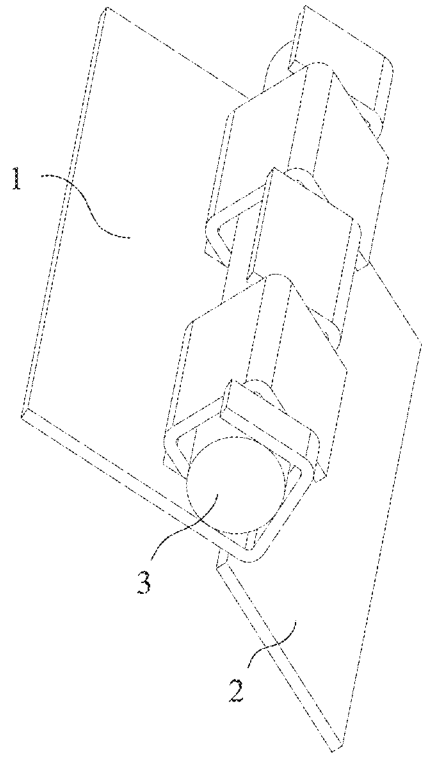
FIG. 5 is a schematic structural view illustrating a hinge structure according to an embodiment of the application in an intermediate transition state between an original state and a limiting state.

The maximum rotation angle between the first connecting portions 12 and the second connecting portions 22 is approximately 90°. FIGS. 1, 3, and 5 respectively illustrate an original state in which the first connecting portions 12 and the second connecting portions 22 are not rotated relative to each other, a limiting state in which they are rotated approximately 90° relative to each other, and an intermediate transition state between the two states. In these states, respective first openings of the first grooves of the first connecting portions 12 and respective second openings of the second grooves of the second connecting portions 22 always face different directions.

In the rotation range of the first board 1 and the second board 2, the first board 1 and the second board 2 may rotate from the state in which they are substantially parallel to each other to the state in which they are substantially perpendicular to each other. When the first board 1 and the second board 2 are in the original state in which they are not rotated relative to each other, the first board body 11 and the second board body 21 are substantially parallel to each other. When the first board 1 and the second board 2 are rotated to the limiting state in which the first connecting portions 12 and the second connecting portions 22 have the maximum rotation angle therebetween, the first board body 11 and the second board body 21 are substantially perpendicular to each other. During the transition between the two states, the relative rotation angle of the first board 1 and the second board 2 is in approximately 90°.

The term "substantially perpendicular" indicates that the angle between the first board 1 and the second board 2 falls within a range of 85°-95°.

The term "substantially parallel" indicates that the angle between the first board body 11 and the second board body 21 falls within a range of −5°-5°.

In the embodiment, the hinge connection between the first board 1 and the second board 2 essentially allows the first board 1 and the second board 2 to rotate about the same shaft, i.e., the hinge shaft 3, which follows the same working principle as the hinge leaves in the prior art. Due to the arrangement of the first connecting portions 12 and the second connecting portions 22 instead of the circular holes of the hinge leaves in the prior art, the first connecting portions 12 and the second connecting portions 22 are allowed to rotate about the hinge shaft 3, respectively, thereby achieving the hinge connection between the first board 1 and the second board 2.

As the first connecting portions 12 and the second connecting portions 22 each has the opening due to inherent characteristics of the bending process, the hinge shaft 3 may fall off from the first connecting portions 12 and the second connecting portions 22 when their two openings face a same direction, resulting in a release of the hinge connection between the first board 1 and the second board 2. In order to avoid such situation, the first board 1 and the second board 2 are designed in such a manner that, throughout the original state, the limiting state and the transition state therebetween, the openings of the first connecting portions 12 and the second connecting portions 22 always face different directions. In particular, the two groups of openings face different directions in the original state; the two groups of openings face different directions in the limiting state; during the transition state between the original state and the limiting state, the first connecting portions 12 and the second connecting portions 22 relatively rotate about the hinge shaft 3. Throughout the rotation, the group of openings of the first connecting portions 12 and the group of openings of the second connecting portions 22 always face different directions.

With such arrangement, no matter the first connecting portions 12 and the second connecting portions 22 are in the original state, the limiting state, or the transition state therebetween, the first connecting portions 12 and the second connecting portions 22 mutually function to limit the position of the hinge shaft 3. Hence, they have a function of relatively rotating about the hinge shaft 3 and meanwhile prevent the hinge shaft 3 from falling off, thereby ensuring the reliability of the hinge connection between the first board 1 and the second board 2.

In the prior art, hinge leaves are usually provided to achieve such hinge connections between the first board 1 and the second board 2. With respect to the situation of using long hinge leaves, the long hinge leaves which extend along the to-be-hinged position have a higher cost. With respect to the situation of using a plurality of short hinge leaves, usually the plurality of short hinge leaves need to be sequentially disposed and spaced apart. In such a case, the plurality of short hinge leaves, which need to meet the coaxial requirement during mounting no matter by welding or bolting, have relatively higher positioning demands and have more difficulty in assembling, thereby leading to a time-consuming assembly process with a higher cost.

For the hinge structure in the embodiment, the existing sheet metal bending machines in the workshop may be used to continuously punch the first board 1 and the second board 2, bend them to define the first connecting portions 12 and the second connecting portions 22.

However, due to the inherent function limitations of the sheet metal bending machines, they cannot process circular axle holes by bending. The first connecting portions 12 and the second connecting portions 22 can only be bent to form the grooves which are unclosed, i.e., the openings respectively formed on the first connecting portions 12 and the second connecting portions 22 as mentioned above. Such hinge structure has a defect in that, throughout the original state, the limiting state, and the transition state therebetween, if there is any moment when the first openings of the first grooves of the first connecting portions 12 and the second openings of the second grooves of the second connecting portions 22 face a same direction, the hinge shaft 3 will fall off from the first grooves of the first connecting portions 12 and the second grooves of the second connecting portions 22, resulting in a failure of the hinge structure between the first board 1 and the second board 2.

In such type of hinge structure in the embodiment, the rotation angle between the first board 1 and the second board 2 is limited. Throughout the original state, the limiting state, and the transition state therebetween within this limited range, the rotation angles of the first board 1 and the second board 2 fall within a range of approximately 0°-90°, among which the original state and the limiting state are the two ultimate states, respectively, please referring to FIGS. 1 and 3. Please referring to FIG. 5, the first connecting portions 12, the second connecting portions 22, and the hinge shaft 3 in such two states or in the transition state between such two states can avoid the said defect. The openings of the first connecting portions 12 and the openings of the second connecting portions 22 always face different directions, whereby the hinge shaft 3 can be prevented from falling off and a stable hinge structure between the first board 1 and the second board 2 can be ensured.

In the embodiment, the hinge structure formed by bending can meet the hinge requirement at reduced cost. Compared with short hinge leaves, the hinge shaft 3, as a long shaft, has the inherent function of positioning the first connecting portions 12 and the second connecting portions 22. In such a case, it reduces assembly difficulty during assembling. It simplifies the hinge structure, and meanwhile reduces mounting difficulty and saves economic costs.

As conventional hinges are manufactured by the sheet metal process, concerning sheet metal products, the parts to be hinged can be directly molded to the hinge structure through the sheet metal process in the embodiment. In such a case, not only the procurement cost of accessories can be reduced, but also the complicated assembly process of accessories can be eliminated.

In the embodiment, the characteristics of the sheet metal bending process and the hinge structure are fully combined in the technical solution, to integrally form the first connecting portions 12 and the second connecting portions 22 which are relatively long, on the edge of sheet metal boards by sheet metal bending with fewer steps, and then provide the hinge shaft 3 for connecting the two parts, thereby achieving connection of the two parts through a long hinge. In such a case, it does not need additional accessory cost and has a simpler assembly.

In the embodiment, the first board body 11 and the first connecting portions 12 may be integrally formed; and the second board body 21 and the second connecting portions 22 may be integrally formed.

The first connecting portions 12 and the first board body 11 may be designed as a one-piece first board which is integrally formed, and the first board have an edge bending to define the first connecting portions 12.

The second connecting portions 22 and the second board body 21 may also be designed as a one-piece second board which is integrally formed, and the second board have an edge bending to define the second connecting portions 22.

In the case of such integral arrangement, during assembly, it only needs to pass the hinge shaft 3 through all the first connecting portions 12 and the second connecting portions 22 to achieve assembly and the hinge connection of the first board 1 and the second board 2. Due to the integral arrangement, the difficulty of assembly can be further reduced. It simplifies the hinge structure, and meanwhile reduces mounting difficulty and saves economic costs.

In the embodiment, when the first connecting portions 12 and the second connecting portions 22 are in the limiting state, the first board body 11 and the second board body 21 are substantially perpendicular to each other, with a portion of the edge of the first board body 11 abutting against the outer side of the second connecting portions 22, and a portion of the edge of the second board body 21 abutting against the outer side of the first connecting portions 12.

In the embodiment, the hinge structure can avoid the defect resulted from the bending process to facilitate simplified hinge structure, reduced mounting difficulty and economic costs only when the maximum rotation angle is approximately 90°.

Due to the arrangement of the limiting state, in which a portion of the edge of the first board body 11 abuts against the second connecting portions 22 and a portion of the edge of the second board body 21 abuts against the first connecting portions 12, the edges of the first board body 11 and the second board body 21 can stop the first connecting portions 12 and the second connecting portions 22 from rotating further relative to each other, whereby the maximum rotation angle between the first board 1 and the second board 2 can be limited to approximately 90°.

In the embodiment, when the first connecting portions 12 and the second connecting portions 22 are in the original state, the first board body 11 and the second board body 21 are substantially parallel to each other, with the first openings of first grooves of the first connecting portions 12 and the second openings of second grooves of the second connecting portions 22 facing different directions.

With such structure, in the original state, a portion of the hinge shaft 3 which is not held by the first connecting portions 12 can be held by the second connecting portions 22, and a portion of the hinge shaft 3 which is not held by the second connecting portions 22 can be held by the first connecting portions 12. Hence, the first connecting portions 12 and the second connecting portions 22 can mutually hold the hinge shaft 3, thereby ensuring the stability of the hinge structure between the first board 1 and the second board 2.

When an external force is applied to the first connecting portions 12 or the second connecting portions 22, the hinge structure may be broken down. With the arrangement that the first connecting portions 12 and the second connecting portions 22 are provided at a same side of the first board body 11 and the second board body 21, even when the first connecting portions 12 or the second connecting portions 22 are subjected to external forces in different directions, the hinge shaft 3 can prevent displacement of the first connecting portions 12 or the second connecting portions 22 that would make the hinge structure break down, thereby ensuring the stability of the hinge structure between the first board 1 and the second board 2.

Similarly, the first connecting portions 12 and the second connecting portions 22 have the maximum rotation angle therebetween, the first board body 11 and the second board body 21 are substantially perpendicular to each other, with the first openings of first grooves of the first connecting portions 12 face towards a side of the second board body 21 opposite to the second connecting portions 22 and the second openings of second grooves of the second connecting portions 22 facing towards a side of the first board body 11 opposite to the first connecting portions 12.

In the limiting state, a portion of the hinge shaft 3 which is not held by the first connecting portions 12 can be held by the second connecting portions 22, and a portion of the hinge shaft 3 which is not held by the second connecting portions 22 can be held by the first connecting portions 12. Hence, the first connecting portions 12 and the second connecting portions 22 can mutually hold the hinge shaft 3. Meanwhile, even when the first connecting portions 12 or the second connecting portions 22 are subjected to external forces in different directions, the hinge shaft 3 can prevent displacement of the first connecting portions 12 or the second connecting portions 22 that would make the hinge structure break down, thereby ensuring the stability of the hinge structure between the first board 1 and the second board 2.

In the embodiment, the first connecting portions 12 and the second connecting portions 22 are all formed with rectangular grooves. Such structure can meet hinge requirements and meanwhile are easy to manufacture and process.

In the embodiment, the clearance between the hinge shaft 3 and inner walls of the first grooves of the first connecting portions 12 is less than the wall thickness of the first connecting portions 12, and the clearance between the hinge shaft 3 and inner walls of the second grooves of the second connecting portions 22 is less than the wall thickness of the second connecting portions 22.

The first grooves formed by bending the first connecting portions 12 have a width and a depth adaptively sized depending on the outer diameter of the hinge shaft 3. Similarly, the second grooves formed by bending the second connecting portions 22 have a width and a depth adaptively sized depending on the outer diameter of the hinge shaft 3.

Ideally, the outer surface of the hinge shaft 3 is tangent to the inner surface of the first connecting portions 12 and the inner surface of the second connecting portions 22, respectively. When viewed in cross-section, the hinge shaft 3 may be the inscribed circle of the first connecting portions 12 and the inscribed circle of the second connecting portions 22. In specific implementation, a certain clearance may be provided between the hinge shaft 3 and the inner wall of the grooves. However, if the clearance is oversized, i.e., greater than the wall thickness of the grooves, the first connecting portions 12 and the second connecting portions 22 may be misplaced, causing the whole hinge structure to break down. Consequently, it is limited that the clearance between the hinge shaft 3 and inner walls of the first grooves of the first connecting portions 12 is less than the wall thickness of the first connecting portions 12, and the clearance between the hinge shaft 3 and inner walls of the second grooves of the second connecting portions 22 is less than the wall thickness of the second connecting portions 22. In such a case, the offset distance of the hinge shaft 3 in the grooves is relatively small and would not cause the whole structure of the first connecting portions 12, the second connecting portions 22, and the hinge shaft 3 to break down.

In the embodiment, the first connecting portions 12 and the second connecting portions 22 may be arranged in a staggered manner along the extend direction of the hinge shaft 3.

The number of the first connecting portions 12 may be plural, and the plurality of first connecting portions 12 may be spaced apart and disposed along the extend direction of the hinge shaft 3. The intervals between each two adjacent first connecting portions 12 can make room for the second connecting portions 22. The length of the first connecting portions 12, i.e., the size along the extend direction of the hinge shaft 3, may be adaptively sized depending on assembly requirements in specific practice. The length of the second connecting portions 22, i.e., the size of the second connecting portions 22 along the extend direction of the hinge shaft 3, may be adaptively sized depending on assembly requirements in specific practice. The second connecting portions 22 may be arranged in a similar manner. The plurality of second connecting portions 22 may be spaced apart and disposed along the extend direction of the hinge shaft 3. The intervals between each two adjacent second connecting portions 22 can make room for the first connecting portions 12.

The first connecting portions 12 and adjacent second connecting portions 22 may be provided with an interval therebetween to expose the hinge shaft 3, or provided to not expose the hinge shaft 3 such that the first connecting portions 12 and the second connecting portions 22 mutually conceal the periphery surface of the hinge shaft 3. As the periphery surface of the hinge shaft 3 is covered, the hinge shaft 3 can be concealed by the first connecting portions 12 and the second connecting portions 22, facilitating good appearance.

All the above are merely preferred embodiments of the present application. It should be noted that, the present application is intended to cover the modifications and equivalent arrangements obtained by those skilled in the art without departing from the technical principle of the present application.

The invention claimed is:

1. A hinge structure, comprising:

a first board comprising a first board body and a first connecting portion provided on at least one side thereof, wherein the first connecting portion extends from a portion of an edge of the first board body and bends to define a first groove;

a second board comprising a second board body and a second connecting portion provided on at least one side thereof, wherein the second connecting portion extends from a portion of an edge of the second board body and bends to define a second groove; and a hinge shaft disposed to extend through the first groove of the first connecting portion and the second groove of the second connecting portion;

wherein a maximum rotation angle between the first connecting portion and the second connecting portion is 90°, and throughout an original state in which the first connecting portion and the second connecting portion are not rotated relative to each other, a limiting state in which they are rotated 90° relative to each other, and an intermediate transition state between the original state and the limiting state, a first opening of the first groove of the first connecting portion and a second opening of the second groove of the second connecting portion always face different directions, and wherein, in the limiting state of the first connecting portion and the second connecting portion, the first board body is perpendicular to the second board body, a portion of an edge of the first board body abuts against the second connecting portion, and a portion of an edge of the second board body abuts against the first connecting portion.

2. The hinge structure according to claim 1, wherein the first board body and the first connecting portion are integrally formed; and the second board body and the second connecting portion are integrally formed.

3. The hinge structure according to claim 1, wherein when the first connecting portion and the second connecting portion are in the original state, the first board body and the second board body are parallel to each other, and the first opening of the first groove of the first connecting portion and the second opening of the second groove of the second connecting portion face opposite directions.

4. The hinge structure according to claim 3, wherein the first connecting portion and the second connecting portion are provided at a same side of the first board body and the second board body.

5. The hinge structure according to claim 1, wherein when the first connecting portion and the second connecting portion have the maximum rotation angle therebetween, the first board body and the second board body are perpendicular to each other, the first opening of first groove of the first connecting portion faces towards a side of the second board body opposite to the second connecting portion, and the second opening of second groove of the second connecting portion faces towards a side of the first board body opposite to the first connecting portion.

6. The hinge structure according to claim 1, wherein the first connecting portion and the second connecting portion are all formed with rectangular grooves.

7. The hinge structure according to claim 1, wherein a clearance between the hinge shaft and an inner wall of the first groove of the first connecting portion is less than a wall thickness of the first connecting portion, and a clearance between the hinge shaft and an inner wall of the second groove of the second connecting portion is less than a wall thickness of the second connecting portion.

8. The hinge structure according to claim 1, wherein the first connecting portion and the second connecting portion are arranged in a staggered manner along an extend direction of the hinge shaft.

9. The hinge structure according to claim 1, wherein the first connecting portion and the second connecting portion mutually conceal a periphery surface of the hinge shaft.

* * * * *